Figure 3:
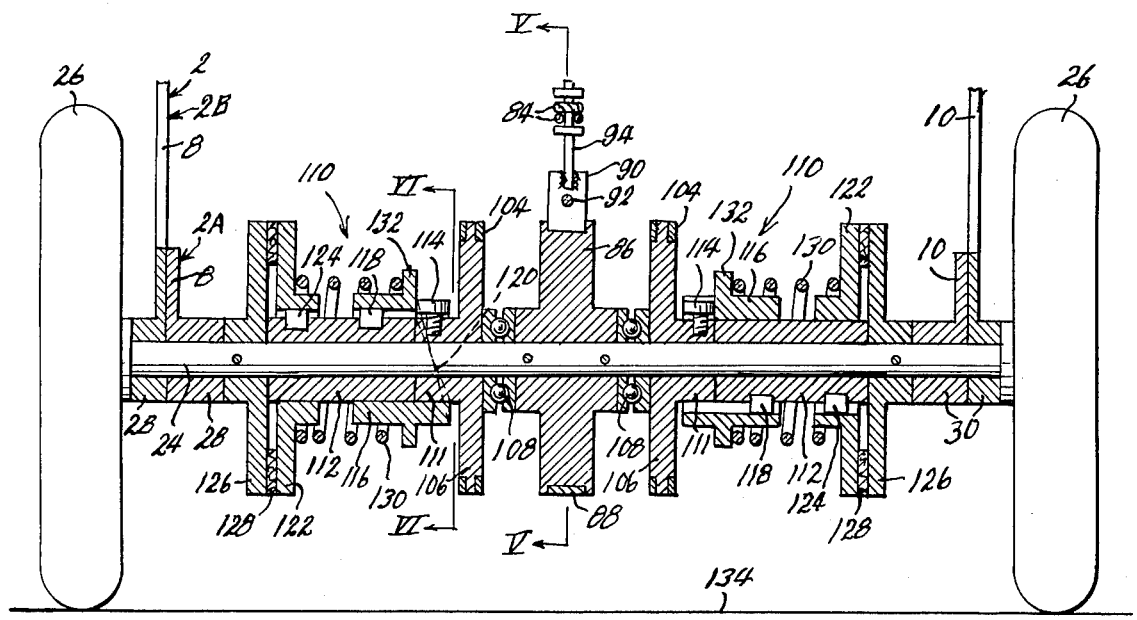

United States Patent [19]

Estell

[11] 3,963,262

[45] June 15, 1976

[54] TOY AUTOMOBILE APPARATUS

[76] Inventor: Gertrude Althea Estell, 10200 W. 98th St., Overland Park, Kans. 66212

[22] Filed: May 27, 1975

[21] Appl. No.: 580,583

[52] U.S. Cl. ............................ 280/231; 273/1 R; 180/77 S
[51] Int. Cl.² ........................................ B62M 1/00
[58] Field of Search .......... 280/222, 231, 232, 273; 272/33 B, 73, 57 T; 273/1 R; 180/77 S

[56] References Cited
UNITED STATES PATENTS 1,577,578   3/1926   Herrera............................. 280/222

*Primary Examiner*—M. H. Wood, Jr.
*Assistant Examiner*—Terrence L. Siemens

[57] ABSTRACT

A toy automobile apparatus resembling two small automobiles in nose-to-nose relation, each adapted to seat a child facing the other child, the apparatus including ground-engaging drive wheels adapted to be driven in respectively opposite directions by two sets of pedals operated respectively by the two children, the driving connection between said wheels and each of said pedal sets including a slipping clutch the output power of which depends on the force and speed with which the associated pedal set is driven, whereby one child can take command and "push" the other if he can operate his pedals with greater force and speed than the other child. Also, each child is provided with a steering wheel operable to steer the apparatus, each steering wheel being operable only when the child controlling it has taken command of the driving force.

9 Claims, 6 Drawing Figures

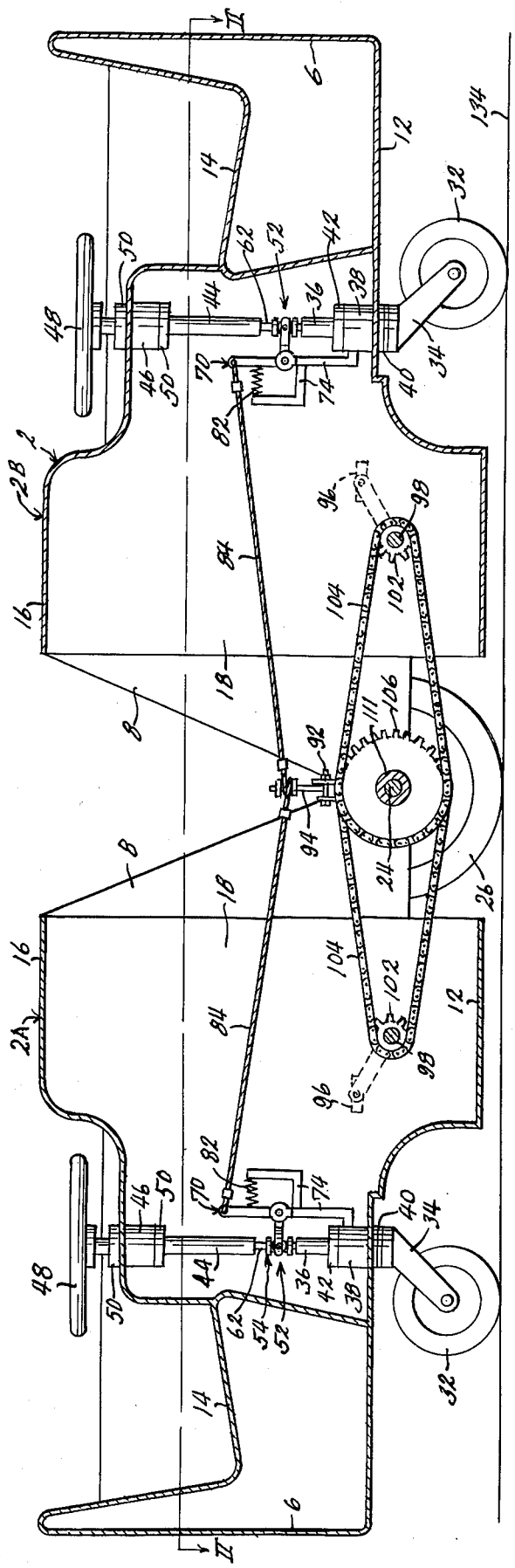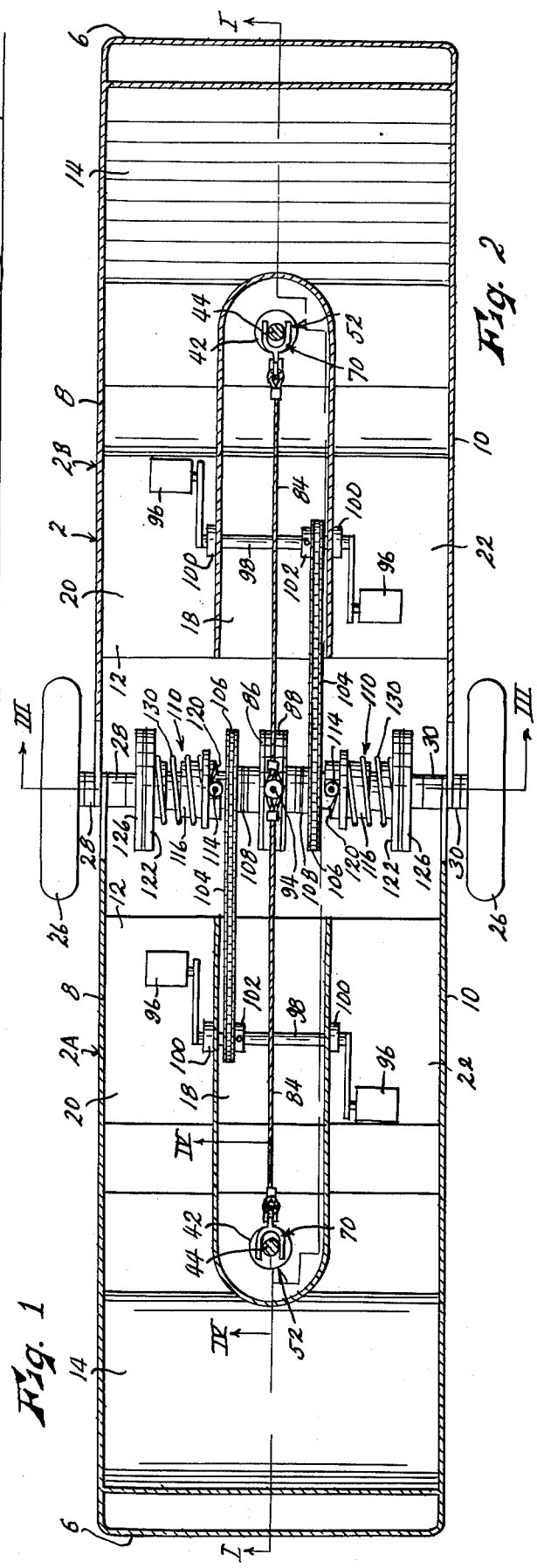

TOY AUTOMOBILE APPARATUS

This invention relates to new and useful improvements in toy vehicular apparatus, and has particular reference to a pedal-operated riding toy.

A principal object of the present invention is the provision of a toy vehicle having seats for two children, preferably confronting each other, and ground-engaging drive wheels drivable in opposite directions to move the vehicle in respectively opposite directions, the wheels being drivable in each direction by a set of pedals operated by one of the children. Provision is made that the child who can operate his set of pedals with the greater speed and force will be able to overpower the driving force of the other set of pedals, and hence control the direction of movement of the vehicle. Thus the elements of a game or contest are introduced into the use of the toy, which it is believed will maintain the interest of the children for a much longer period of time than a mere toy. Generally, this object is accomplished by the introduction of a slipping clutch into the drive train between said drive wheels and each set of pedals, the power output of each clutch depending on the force and speed with which the associated set of pedals is turned.

Another object is the provision of a device of the character described including a steering wheel for each of the riding children, and each operable to steer the vehicle, but each including a disengageable coupling in the connection thereof to the associated steerable ground-engaging wheel, and means whereby the child successful in taking command of the direction of vehicle travel also disengages the steering coupling of the other child, and hence also takes control of the steering.

Other objects are simplicity and economy of construction, and efficiency and dependability of operation.

Figures 4, 5, 6:
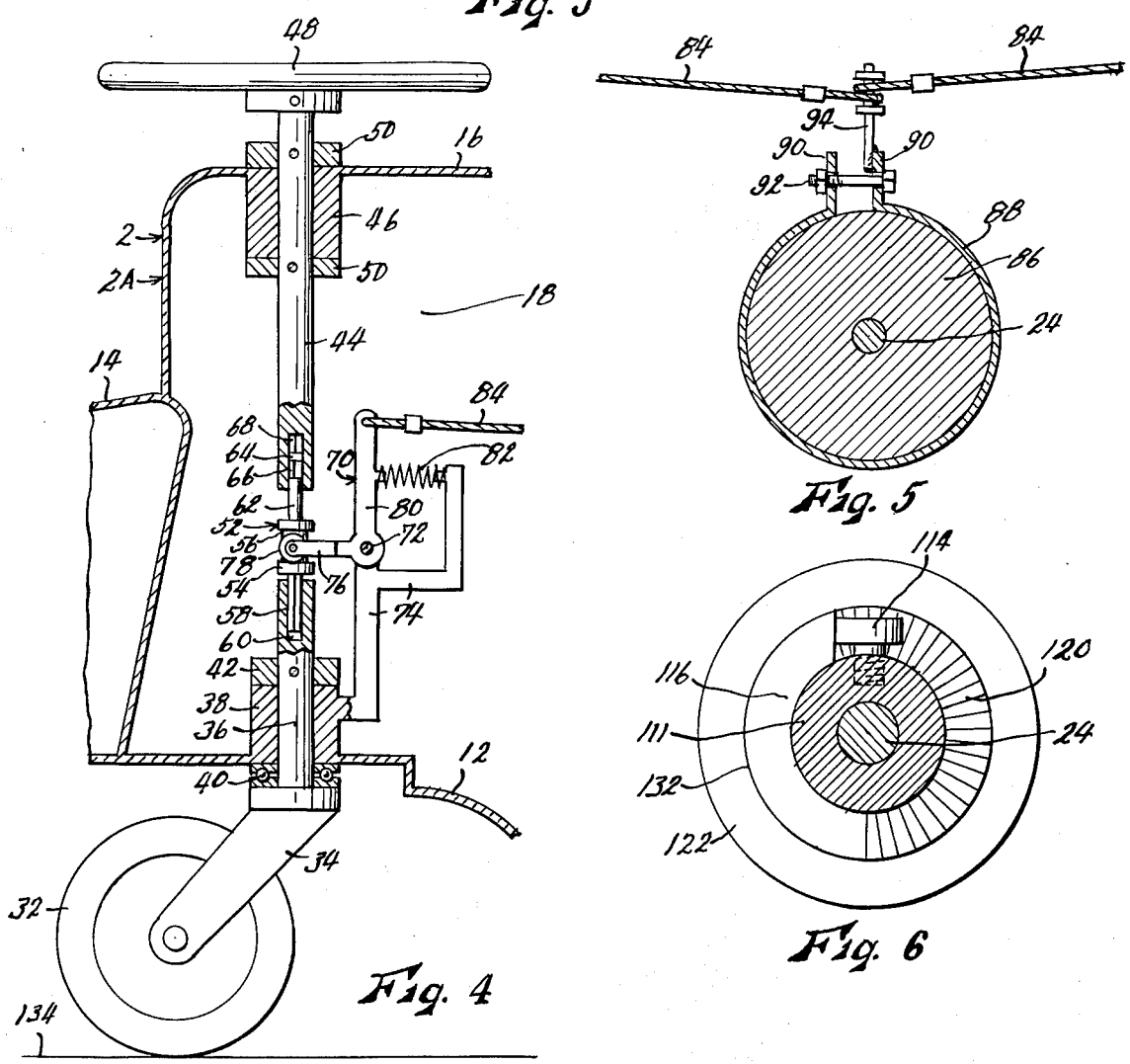

With these objects in view, as well as other objects which will appear in the course of the specification, reference will be had to the accompanying drawing, wherein:

FIG. 1 is a longitudinal sectional view of a toy automobile apparatus embodying the present invention, taken on line I—I of FIG. 2, FIG. 2 is a sectional view taken on line II—II of FIG. 1, FIG. 3 is an enlarged, fragmentary sectional view taken on line III—III of FIG. 2, FIG. 4 is an enlarged, fragmentary sectional view taken on line IV—IV of FIG. 2, FIG. 5 is a fragmentary sectional view taken on line V—V of FIG. 3, and FIG. 6 is an enlarged sectional view taken on line VI—VI of FIG. 3.

Like reference numerals apply to similar parts throughout the several views, and the numeral 2 applies generally to the vehicle body which is divided into two substantially identical sections 2A and 2B, which are desirably so painted or otherwise externally decorated as to resemble two small cars disposed in nose-to-nose, contacting relation. Said body sections may be formed of any suitable material, such as molded fiber glass, and each includes a back wall 6, side walls 8 and 10, a floor 12, a seat 14, and a top wall 16. Seats 14 are disposed at the distal ends of body sections 2A and 2B, confronting each other, and top walls 16 extend forwardly from said seats, having reference to the "cars" represented by said body sections. A hollow "chain well" 18, disposed midway between side walls 8 and 10 extends forwardly from the forward edge of seat 14 generally to the forward end of the body section, and is open at its forward end. The spaces between said chain well and side walls 8 and 10 form leg wells 20 and 22, into which a child seated on seat 14 may insert his legs.

Body sections 2A and 2B are joined at their contiguous ends by a horizontal transverse axle 24 having a ground-engaging drive wheel 26 fixed on each end thereof. Body sections 2A and 2B are pivoted independently on said axle, body side walls 8 being provided with bearings 28 journalled on said axle, and body side walls 10 being provided with bearings 30 journalled on said axle. Thus the body may be caused to travel selectively in either longitudinal direction transverse to the axle, depending on the direction in which said axle is turned. Each body section is also supported by a ground-engaging steerable wheel 32 spaced apart from axle 24 longitudinally of the vehicle. Each wheel 32 is carried rotatably by a caster frame 34 so as to be horizontally offset from a vertical shaft 36 to which bracket 34 is affixed. Shaft 36 extends vertically upwardly through floor 12 of the associated body section and is journalled rotatably in a bearing 38 mounted in said floor. A thrust bearing 40 is interposed between floor 12 and caster bracket 34, and a collar 42 fixed on shaft 36 above bearing 38 secures said shaft against longitudinal movement in said bearing. Shaft 36 projects upwardly into chain well 18 of the associated body section.

A vertical steering shaft 44 is disposed coaxially with shaft 36, its lower end being spaced above the upper end of shaft 36, within chain well 18. Steering shaft 44 extends upwardly through top wall 16 of the associated body section, being journalled rotatably in a bearing 46 fixed in said top wall, and has a manually operable steering wheel 48 affixed thereto above said top wall. Longitudinal movement of shaft 44 in bearing 46 is prevented by collars 50 affixed to said shaft respectively above and below said bearing.

Steering shaft 44 is operably engageable with wheel shaft 36 by means of a clutch-type coupling indicated generally by the numeral 52, and best shown in FIG. 4. Said coupling includes a cylindrical body member 54 disposed coaxially with said shafts, between the spaced apart contiguous ends thereof, and having a groove 56 formed peripherally therein. An integral vertical spindle 58 extends downwardly from said body member, and is of square or otherwise non-circular configuration, engaging slidably but non-rotatably in a socket 60 of matching configuration formed axially in the upper end of shaft 36. An integral vertical spindle 62 extends upwardly from body member 54 and is engaged in a socket 64 formed axially in the lower end of shaft 44. When coupling body 54 is lowered as far as possible, as shown in FIG. 4, spindle 62 is freely rotatable in socket 62, the coupling then being disengaged so that manual operation of steering wheel 48 has no effect on steerable ground-engaging wheel 32. However, the extreme upper end portion 66 of spindle 62, and the extreme upper end portion 68 of socket 64, are correspondingly rendered square or otherwise non-circular so that when body member 54 is elevated to engage spindle portion 66 in socket portion 68, the coupling is engaged and the turning of steering wheel 48 will control ground-engaging wheel 32 to steer the vehicle.

Coupling body 54 is raised and lowered by means of a bellcrank lever 70 pivoted at its angle, as at 72, to a bracket 74 affixed to bearing 38, or any other convenient portion of the vehicle body, on a horizontal transverse axis adjacent the coupling. Said lever has a generally horizontal leg 76 having the form of a yoke embracing coupling body 54, each of the yoke arms having a roller 78 rotatably mounted thereon on a horizontal axis, said roller being engaged in groove 56 of the coupling body, and a generally vertical, upwardly extending leg 80. A compression spring 82 interposed between bracket 74 and lever leg 80 biases said lever in a direction to cause it to lower coupling body 54, thereby disengaging the coupling. A flexible cable 84 is connected to the upper end of lever leg 80, and extends generally horizontally and longitudinally of the vehicle body toward drive axle 24. It will be noted that the levers 70 of the respective vehicle body sections 2A and 2B are so arranged that pulling of either cable 84 toward drive axle 24 will overcome the associated spring 82 and pivot the associated lever 70 to engage the associated coupling 52.

Fixed coaxially on drive axle 24, substantially at the midpoint thereof, is a brake drum wheel 86, about which is disposed a flexible friction band 88, said band being provided at its ends with outturned ears 90 joined by a bolt 92 which may be tightened or loosened to vary the frictional resistance to rotation of the drum within the band. An upwardly projecting rod 94 is affixed to one of ears 90, and the contiguous ends of both of flexible cables 84 are attached to the upper end of said rod. It will be seen that when rod 94 is disposed vertically, as in FIG. 1, with cables 84 held taut by the tension of springs 82, both of couplings 52 are disengaged. However, when drive axles 24 is turned in either direction, as will be described, it turns brake drum 86 in the same direction, causing band 88 to turn in the same direction until the friction of the band thereon, as applied by bolt 92, is overcome, whereupon the drum will turn within the band. This applies tension to one of cables 84 or the other, whereby the coupling 52 associated with the tensioned cable is engaged, while the other cable 84 goes slack and the coupling 52 associated therewith is maintained disengaged by its spring 82.

Each vehicle section 2A and 2B carries a pair of foot-operated pedals 96. These pedals are disposed respectively in the two leg wells 20 and 22 of the vehicle section, in a position convenient to the feet and legs of a child occupying seat 14 of the same vehicle section, and are fixed to the opposite ends of a horizontal transverse pedal shaft 98 which extends transversely through the chain well 18 and is journalled in bearings 100 mounted in the side walls of the chain well. A chain sprocket 102 is affixed to shaft 98 within the chain well. An endless sprocket chain 104 is trained about each of sprockets 102, and about a sprocket 106 mounted rotatably on drive axle 24. The sprockets 106 of the two chains are disposed at respectively opposite sides of brake drum 86, and are separated therefrom by thrust bearings 108. Sprockets 106 form elements of two separate slipping clutches each indicated generally by the numeral 110, and best shown in FIG. 3.

Each sprocket 106 is provided with a hub 111 rotatable on axle 24 and extending outwardly therealong. Adjacent sprocket 106, a roller 114 is mounted on hub 111, said roller being disposed adjacent the surface of said hub and being rotatable about an axis radial to said hub. A cylindrical sleeve 112 is mounted rotatably on shaft 24 outwardly from and abutting each hub 111, and is of the same diameter as said hub. A cylindrical sleeve 116 is mounted coaxially on hub 111 and sleeve 116 outwardly of roller 114, said sleeve being axially slidably along sleeve 112 but being secured against rotation relative thereto by a key 118. The end surface of sleeve 116 adjacent roller 114 is helically curved to provide a cam surface 120 against which roller 114 is engaged. The two cam surfaces 120 are inclined in the same direction, so that the left sleeve 116, as viewed in FIG. 3, is urged outwardly along its sleeve 112 when the associated sprocket 106 is turned in a direction representing movement of the vehicle to the right, as viewed in FIG. 1, and right sleeve 116, as viewed in FIG. 3, is urged outwardly when its associated sprocket 106 is turned in a direction representing movement of the vehicle to the left, as viewed in FIG. 1.

Outwardly of each sleeve 116, a clutch disc 122 is mounted on the associated sleeve 112 for axial sliding movement therealong, said disc being secured against rotation on said sleeve by a key 124. The outer surface of said clutch disc, which is normal to axle 24, bears against the inner face of a second clutch disc 126 which is rigidly fixed on axle 24, and abuts the outer end of sleeve 112, a friction ring 128 of fibrous material or the like being interposed between said clutch discs and being secured permanently to one of said discs. Each clutch also includes a helical compression spring 130 coaxial with shaft 24, bearing at one end against clutch disc 122, and at its opposite end against a flange 132 of sleeve 116. Said spring urges clutch disc 122 against clutch disc 126 with a certain minimum pressure even when sprockets 106 are not turning at all, and rollers 114 rest at the "lowest" points of cam surfaces 120.

In preferred operation, a child occupies each seat 14, whereby they confront each other, and operates his own pedals 96 to attempt to drive his own "car" 2A or 2B forwardly, pushing the other "car" ahead of his own. As viewed in FIG. 1, the normal rotation of pedals 96 of vehicle section 2A is clockwise, while the pedals of which section 2B turn in a counter-clockwise direction. As each child operates his pedals, they turn sprockets 106 in correspondingly opposite directions, thereby causing the roller 114 associated with each sprocket to ride "upwardly" along the cam surface 120 of the associated sleeve 116, forcing said sleeve outwardly to compress the related spring 130 and force the related clutch discs 122 and 126 more tightly together to apply a rotative torque to axle 24 and drive wheels 26. The minimum pressure between its clutch discs provides enough resistance to the rotation of sleeve 116 that the roller will always initially "climb" the cam and the more it climbs, the greater the resistance. The two clutches of course are attempting to drive said axle and wheels in respectively opposite directions, and the direction the drive axle and wheels will actually turn depends on one clutch or the other delivering a greater torque to axle 24 than the other. The torque delivered by each clutch depends basically on the degree to which its spring 130 has been compressed, which in turn is determined by the height along cam surface 120 to which its roller 114 has been forced by rotation of sprocket 106 under the impetus applied to pedals 96. Thus the wheel torque ultimately delivered by each clutch 110 is determined by the force and speed with which each child can turn his pedals, and the child who can apply the greater force and speed will cause the vehicle to travel forwardly with respect to himself, with the clutch driven by the other child slipping in a reverse direction. The inclination of cam surfaces 120 should be sufficiently steep that there is never a wedging action, so the system will always return to normal, with rollers 114 at the "bottoms" of cams 120, whenever pressure on pedals 96 is released. Thus the use of the vehicle by two children constitutes a contest of skill, strength and endurance between the children, making possible games in which each child attempts to force the vehicle to travel to a specified "goal" separate from the other child's "goal".

It will be seen also that whenever either child succeeds in taking command of the drive of the vehicle, as just described, drum 86 and friction band 88, acting through one of cables 84 as previously described, automatically engages the coupling 52 connecting the steering wheel 48 of that child with the associated steerable wheel 32, so that he also takes control of steering the vehicle, while the steerable wheel 32 controlled by the other child remains uncoupled and casters freely about the axis of its shaft 36, and cannot interfere with the steering control of the other wheel 32. This possibility of taking, or losing, control of the steering introduces further elements of interest into games or contests played with the toy, such as the added aim for each child of propelling the vehicle along a specified course of travel. The pivoting of both vehicle sections 2A and 2B on drive axle 24 provides that both of steerable wheels 32 will rest firmly on the supporting surface 134 regardless of any unevenness of said surface.

While I have shown and described a specific embodiment of my invention, it will be readily apparent that many minor changes of structure and operation could be made without departing from the spirit of the invention.

What I claim as new and desire to protect by Letters Patent is:

1. A toy automobile apparatus comprising:
  a. a vehicle body having seats for two persons and supported by ground-engaging drive wheels carried rotatably thereby,
  b. a pair of manually operable propelling means carried by said vehicle body, each operable by a person occuping one of said seats,
  c. a drive train interconnecting each of said propelling means with said drive wheels, and operable when actuated to turn said drive wheels in respectively opposite directions to propel said vehicle body in respectively opposite directions, and
  d. a slipping clutch included in each of said drive trains, the output power of each of which is dependent on the force and speed with which the corresponding propelling means is manually operated, whereby one person or the other may determine the direction in which said vehicle body is driven.

2. An apparatus as recited in claim 1 wherein each of said propelling means comprises a set of foot-operated pedals positioned for operation by a person occupying one of said seats.

3. An apparatus as recited in claim 1 wherein said vehicle body is additionally supported by a pair of independently operable ground-engaging steerable wheels carried by said body for turning about vertical axes to alter the course of travel of said vehicle, and with the addition of:
  a. a pair of manually operable steering wheels carried by said body, each being positioned for operation by a person occupying one of said seats,
  b. an operating connection between each of said steering wheels and one of said steerable ground-engaging wheels,
  c. a releasable coupling interposed in each of said operating connections, and
  d. means responsive to the direction of travel of the vehicle, as determined by the drive train controlling said direction of travel at any given moment, to automatically engage the steering coupling associated with the controlling drive train, and disengage the other of said steering couplings.

4. An apparatus as recited in claim 3 wherein each of said ground-engaging steerable wheels is offset horizontally from its vertical steering axis, whereby it will caster freely about said vertical axis whenever its steering coupling is disengaged, and therefore will not interfere with the steering action of the other of said steering wheels the coupling of which is engaged.

5. An apparatus as recited in claim 3 wherein said vehicle body is of horizontally elongated configuration, and is transversely divided midway between its ends into two sections so as to resemble two vehicles disposed in nose-to-nose abutting relation, said body sections being pivotally mounted on a horizontal, transversely extending axle, said ground-engaging drive wheels being fixed on said axle, and said ground-engaging steerable wheels each being carried by one of said body sections in opposite laterally spaced relation from said axle.

6. An apparatus as recited in claim 1 wherein said vehicle body is of horizontally elongated form, said seats being disposed at the distal ends of said body in confronting relation, and said body being transversely divided into two sections midway between its ends, whereby to resemble two vehicles disposed in nose-to-nose abutting relation, said body sections each being pivotally mounted on a common horizontal transverse axle at their contiguous ends, said ground-engaging drive wheels being fixed coaxially on said axle, and with the addition of:
  a. a ground-engaging steerable wheel carried rotatably by each of said body sections in laterally spaced relation from said axle, each steerable wheel also being rotatable about a vertical axis whereby to steer said vehicle,
  b. a manually operable steering wheel carried by each of said body sections and having an operating connection to the ground-engaging steerable wheel of that body section,
  c. a releasable steering coupling interposed in each of said operating connections, and
  d. coupling operating means automatically responsive to the direction of rotation of said axle to engage the steering coupling of the steerable wheel of the body section the drive train of which is controlling the rotation of said axle at any given moment, and to disengage the other of said steering couplings.

7. An apparatus as recited in claim 6 wherein said steering couplings are disposed in opposite laterally spaced relation from said drive wheel axle, wherein said drive trains are both operable to drive said axle, but in respectively opposite directions, and wherein said couplings operating means comprises:

a. spring means biasing each of said steering couplings toward a disengaged condition,
b. a flexible cable connected to each coupling and operable by tension thereon to engage said coupling, the cables of both couplings extending oppositely toward said axle,
c. a brake drum fixed coaxially on said axle, and
d. a friction ring mounted on said brake drum for friction-resisted rotation thereon, and including a radially projecting arm, the contiguous ends of both of said cables being connected to said arm, said arm having one position relative to said axle in which both of said cables are taut and both of said couplings are disengaged.

8. An apparatus as recited in claim 7 wherein each of said ground-engaging steerable wheels is offset horizontally from its vertical steering axis, whereby it will caster freely when its associated steering coupling is disengaged.

9. An apparatus as recited in claim 6 wherein said propelling means comprises two sets of foot-operated pedals each carried by one of said body sections and positioned for operation by a person occupying the seat of that body section, and wherein said drive trains and slipping clutches comprise:
a. a pair of first clutch discs fixed coaxially on said drive wheel axle,
b. a pair of second clutch discs mounted coaxially for rotation and axial sliding movement on said axle, each in engagement with one of said first clutch discs,
c. a sleeve carried rotatably for axial sliding movement relative to said shaft in combination with each of said clutch disc combinations in axially spaced relation from the second clutch disc of said combination,
d. a compression spring interposed between each of said sleeves and the associated second clutch disc, whereby axial sliding movement of said sleeves to compress said springs forces said second clutch discs axially against said first clutch discs, the end of each of said sleeves distal from its associated second clutch disc being formed to present a cam surface helical relative to said shaft, the cam surfaces of both sleeves sloping in the same direction,
e. a pair of rollers carried by said axle for rotation on an axis radial to said axle and also for rotation about the axis of said axle, each of said rollers engaging one of said sleeve cam surfaces, and
f. means operable by actuation of each of said sets of pedals to rotate one of said rollers about said axle, respectively in opposite angular directions.

* * * * *